Feb. 11, 1936.  W. C. NEIN  2,030,116
DETACHABLE WATT-HOUR METER
Filed Oct. 27, 1934
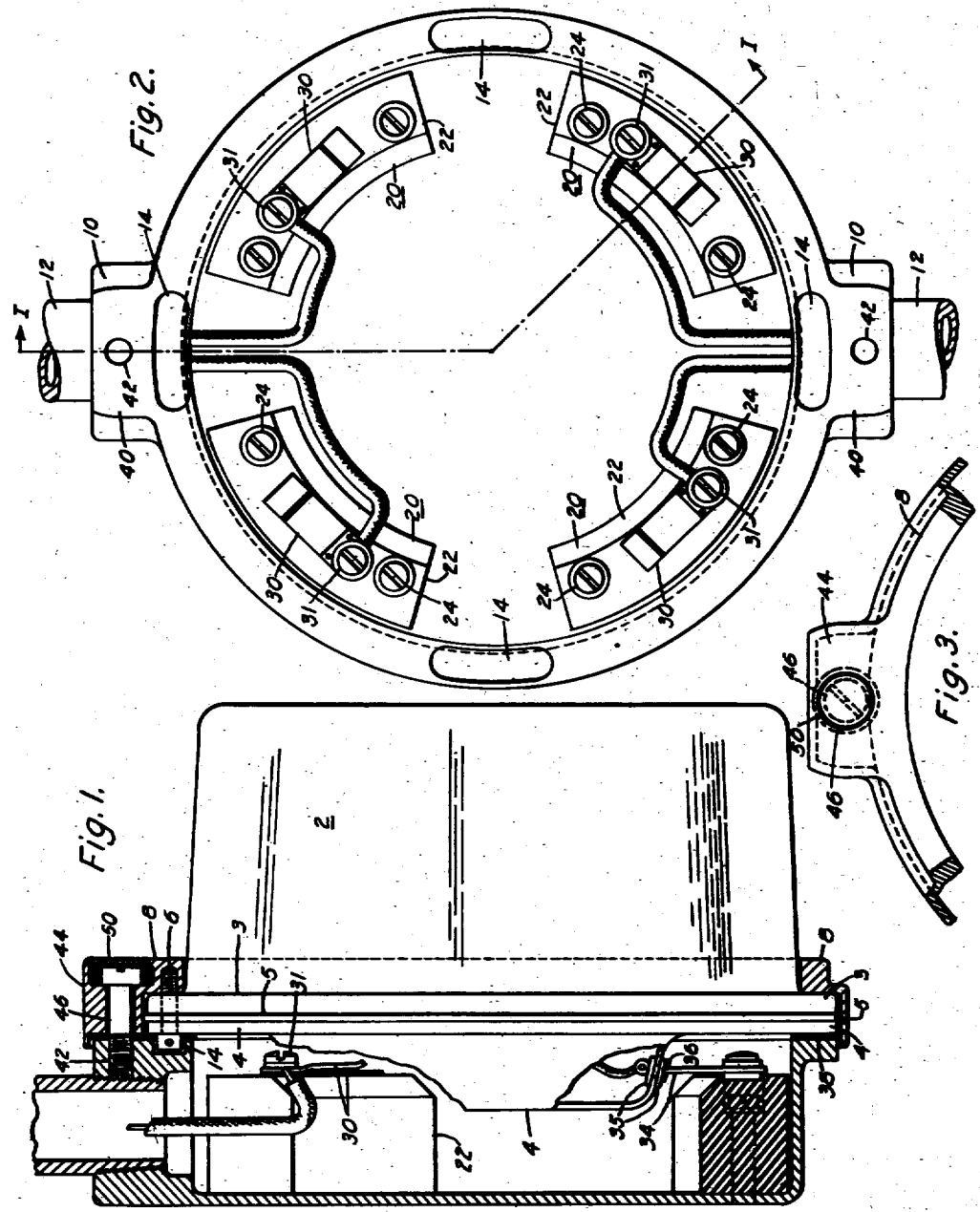
WITNESSES:
INVENTOR
William C. Nein
BY
ATTORNEY Patented Feb. 11, 1936

2,030,116

UNITED STATES PATENT OFFICE 2,030,116

DETACHABLE WATT HOUR METER

William C. Nein, White Plains, N. Y., assignor to Westinghouse Electric & Manufacturing Company, East Pittsburgh, Pa., a corporation of Pennsylvania Application October 27, 1934, Serial No. 750,283

5 Claims. (Cl. 247—2)

My invention relates to electrical measuring instruments, and more particularly, to an improved detachable mounting for a watthour meter, electrical instrument or the like, of the general character shown in Patent No. 1,893,177, issued January 3, 1933 to W. G. Mylius, et al., or Patent No. 1,969,499 issued August 7, 1934, to W. M. Bradshaw, et al.

In detachable mountings for watthour meters, measuring instruments, and other electrical instrumentalities of the general type disclosed in the aforesaid Letters Patent, the casing for the meter, instrument or the like is provided with contacts projecting from the base of the casing parallel to the axis thereof for cooperation with appropriately disposed contacts in a base receptacle, so that the contacts on the casing and in the receptacle telescopically cooperate to complete a circuit when the casing is placed in operative position. In view of the fact that all of the contacts project in a direction parallel to the axis of the casing, the combined height of the casing and base receptacle is quite large and it is one of the objects of the present invention to decrease the space requirements of this type of installation.

It is a further object of the present invention to provide an improved mounting for meters, instruments and the like, whereby the casing may be mounted on a base receptacle and the cooperating contacts of the meter and receptacle are operatively engaged by a relative rotary movement between the casing and receptacle, and coincident with such movement the casing is drawn firmly against the receptacle.

In practicing the present invention, I provide a casing for a meter or instrument having a circular base portion, and contacts for completing the circuit to the operating mechanism of the meter or instrumentality projecting radially from the base, but, however, within the confines of the periphery thereof. A base receptacle coextensive in lateral dimensions with the base of said casing is provided with resilient contacts disposed in a plane substantially parallel to the plane of said casing contacts, so that the casing may be placed upon the base and, by a slight rotary movement, the contacts on the casing and in the base may be moved into engagement, and at the same time, draw said casing toward the base.

An embodiment of my invention is shown in the attached drawing, wherein:

Figure 1 is a view, in side elevation, partly in section taken on the line I—I of Fig. 2, of a meter or instrument mounting in accordance with the present invention;

Fig. 2 is a plan view of the base receptacle shown in section in Fig. 1; and

Fig. 3 is a plan view, partly in section, of a detail of the construction shown in Fig. 1.

Referring more specifically to the drawing, and assuming, for present purposes, that the embodiment shown is for encasing a watthour meter, my construction contemplates a cover 2 of suitable material for enclosing a watthour meter mechanism. Preferably the cover 2 is of glass, so that the integrating dials of the meter may be read but obviously if a translucent material is employed, a suitable window may be provided for this purpose. The cover is provided with a peripheral flange 3 adapted to rest upon a base plate 4, upon which the meter mechanism is mounted, and having a depressed central portion as shown in Fig. 1. The arrangement is quite similar to that shown in the patents above mentioned.

A suitable gasket 5 of felt, cork, or the like, may be interposed between the flange 3 and the plate 4 to prevent the entrance of moisture or foreign matter into the space surrounding the meter mechanism.

The glass cover and base plate 4 are secured together by four bolts 6 extending through suitable apertures in these members and the washer 5, and in threaded engagement with a circular metallic flange 8. When the bolts 6 are tightened they will draw these parts together to maintain a moisture-tight seal between the cover 2 and the plate 4. The head of each of the bolts 6 may be provided, as indicated, with an aperture for receiving a sealing wire (not shown) secured to the base plate 4 at a point adjacent to the bolt head in an obvious manner.

Referring to Fig. 2, the base receptacle (shown in section in Fig. 1) comprises a member of cup-shape having a lateral flange of substantially the same diameter as the base plate 4, and enlarged bosses 10 at diametrically opposed sides thereof which are threaded to receive conduit 12 for enclosing the usual line and load conductors of the circuit to be metered. The base may be, and preferably is, of cast material, and the peripheral edge thereof is provided with four recesses 14 for receiving the heads of the screws 6 to act as guides to properly position the casing on the base receptacle.

Four contact mountings 20 are disposed within the receptacle, each comprising a block 22 of insulating material, suitably secured to the bottom of the receptacle by screws 24. These blocks are equally spaced circumferentially in the receptacle.

Each block 20 is provided with a contact member 30 adapted to be connected, as indicated, to the circuit to be metered, by means of terminal screws 31. The base contacts are shown more in detail in the upper part of Fig. 1, as comprising two resilient superimposed blades 30 disposed in a plane at a slight angle to the plane of the base of the receptacle for a purpose hereinafter described.

Four contact blades 34 project radially from the base 4 of the meter casing. One of such blades is indicated in Fig. 1 but it is intended that there shall be four of them spaced in accordance with the spacing of the contacts 30 in the base receptacle. The blades 34 project through the side wall of the depressed portion of base plate 4 and are suitably secured in position by insulation washers 35 cooperating with the rolled inner end of the blade and cotter pins 36 extending through the blades. The contact blades are adapted to be received between the blades 30 in the base receptacle when the base 4 of the meter casing and its associated structure is given a slight rotary movement with reference to the base receptacle.

In order to place the meter casing in operative position in the receptacle, the bolt heads 6 are disposed in the recesses 14 in the receptacle flange, in a position in which the contact blades 34 of the meter are not in engagement with the contact blades 30 in the base. The meter is then given a slight rotary movement in a counter-clockwise direction, the extent of which depends upon the length of the recesses 14, to bring the blades 34 between and in engagement with the respective blades 30, to thereby complete the metering circuit. In view of the fact that the blades 30 are in a plane slightly inclined toward the base of the receptacle, the rotary movement tends to draw the meter casing closer into engagement with the face of the flange on the base receptacle. If desired, a washer 38 of felt, or other suitable material, may be disposed between the cooperating surfaces of the base 4 and the flange of the base receptacle, as shown in Fig. 1.

Each of the enlarged bosses 10 on the base receptacle is provided in the upper face thereof with a flattened portion 40 (Fig. 2) having a threaded aperture 42 therein, and the sealing ring 8 is similarly provided with enlargements 44 (Fig. 3) having apertures therein for receiving securing bolts 46 which are threaded to cooperate with the threaded apertures 42 in the bosses 10. After the meter has been placed in position with the contacts in engagement as above described, the bolts 46 may be inserted to secure the assembly in a more positive manner than afforded by the cooperating contact blades.

In order to seal the assembly to discourage unauthorized tampering, sealing caps 50 may be pressed over the heads of the bolts 46 to cooperate with overhanging portions of the aperture surrounding said heads to prevent removal of the bolts 46 without mutilation of the caps. This is a well known sealing expedient, but other known means may be employed.

With the structure above described, an efficient meter mounting is obtained whereby the meter may be placed in position on its base receptacle and drawn toward the receptacle to insure a dust-tight fit and positive contact engagement as the meter is given a slight rotary movement relative to the receptacle.

In view of this symmetrical spacing of the contact means in the base and on the casing, the casing may be mounted in four different positions with respect to the base so that the meter or like device within the casing may always be upright to facilitate reading thereof whether the conduits 12 extend vertically, or horizontally.

Further, with the type of construction shown in the two patents aforesaid, when the meter casing is not in operative position on its base it usually rests upon its projecting contacts with the possibility of injury to or fouling of such contacts. With the present construction, however, the meter casing may be rested upon the bottom of the depressed portion of the base plate 4 and the contacts will not touch the supporting surface.

The specific construction shown in the drawing is merely one of many modifications embodying the principles of the invention, and it is desired that no limitations be placed upon it except as imposed by the appended claims.

I claim as my invention:

1. In combination, a receptacle having an open side and electrical contact surfaces disposed therein extending in a plane substantially parallel to the plane defined by said open side, an encased electrical instrument having a base portion proportioned to close said open side, contacts on said base spaced in accordance with the spacing of said receptacle contact surfaces and extending in substantially the same plane therewith when said base portion is in receptacle-closing position.

2. In combination, a receptacle having an open side and electrical contact means mounted therein, including a conducting surface extending at a slight angle to the plane of said open side, an encased electrical instrument having a base adapted to rest upon said receptacle to close said open side and having contact means on said base including a conducting surface substantially parallel to said base and in the same plane as a portion of said receptacle conducting surface when the base is in receptacle-closing position, said respective contact means being so disposed that a relative rotary movement between said base and receptacle causes the engagement thereof and draws said base toward the receptacle.

3. In combination, an encased electrical instrument having contacts mounted on a wall thereof, a receptacle having an open side adapted to be closed by said wall for enclosing said instrument contacts, contacts mounted in said receptacle, said instrument and receptacle contacts being proportioned and disposed to complete a circuit to said instrument and draw said casing against said receptacle by a rotary movement of said casing with respect to the receptacle in the plane defined by the open side of the receptacle.

4. In combination, an encased electrical instrument having contacts mounted on a wall thereof, a receptacle having an open side adapted to be closed by said wall for enclosing said instrument contacts, additional contacts within said receptacle, said instrument and receptacle contacts being proportioned and disposed to complete a circuit to said instrument and draw said casing against said receptacle by a rotary movement of said casing with respect to the receptacle in the plane defined by the open side of the receptacle, and means for limiting the said rotary movement.

5. In combination, an encased electrical instrument having contacts mounted on a wall thereof, a receptacle having an open side adapted to be closed by said wall for enclosing said instrument contacts, additional contacts within said receptacle, said instrument and receptacle contacts being proportioned and disposed to complete a circuit to said instrument and draw said casing against said receptacle by a rotary movement of said casing with respect to the receptacle in the plane defined by the open side of the receptacle, means for limiting such rotary movement, and means for securing said instrument casing to said receptacle at the limit of such movement.

WILLIAM C. NEIN.